United States Patent
Yu et al.

(10) Patent No.: US 11,531,535 B2
(45) Date of Patent: Dec. 20, 2022

(54) FIRMWARE UPGRADE METHOD AND APPARATUS, AND TERMINAL

(71) Applicant: Huawei Technologies Co., Ltd., Shenzhen (CN)

(72) Inventors: Yang Yu, Hangzhou (CN); Yuhao Xi, Hangzhou (CN); Cong Zhu, Hangzhou (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 83 days.

(21) Appl. No.: 17/140,847

(22) Filed: Jan. 4, 2021

(65) Prior Publication Data
US 2021/0124573 A1    Apr. 29, 2021

Related U.S. Application Data

(63) Continuation of application No. PCT/CN2019/108397, filed on Sep. 27, 2019.

(30) Foreign Application Priority Data

Oct. 25, 2018 (CN) .......................... 201811247582.8

(51) Int. Cl.
*G06F 8/658* (2018.01)
*G06F 8/41* (2018.01)
(Continued)

(52) U.S. Cl.
CPC .............. *G06F 8/658* (2018.02); *G06F 8/433* (2013.01); *G06F 8/63* (2013.01); *G06F 8/71* (2013.01)

(58) Field of Classification Search
CPC ... G06F 8/63; G06F 8/71; G06F 8/443; G06F 8/658
See application file for complete search history.

(56) References Cited

U.S. PATENT DOCUMENTS 6,546,552 B1   4/2003 Peleg
7,975,147 B1   7/2011 Qumei
(Continued)

FOREIGN PATENT DOCUMENTS

CN   1658574 A   8/2005
CN   1726476 A   1/2006
(Continued)

OTHER PUBLICATIONS

Pingale et al., "Design aspects for Upgrading Firmware of a Resource Constrained Device in the Field", May 2016, IEEE (Year: 2016).*

(Continued)

*Primary Examiner* — Wei Y Zhen
*Assistant Examiner* — Junchun Wu
(74) *Attorney, Agent, or Firm* — Leydig, Voit & Mayer, Ltd.

(57) ABSTRACT

Embodiments disclose a firmware upgrade method and apparatus, and a terminal. The method includes: sequentially obtaining first upgrade data and operation instructions in all data blocks in a block differential upgrade package; converting first data into a second upgrade data in an image of an old firmware version according to the operation instruction; and controlling the first upgrade data and the second upgrade data to overwrite a to-be-upgraded data area in the image of the old firmware version. An operation of upgrading to an image of a new firmware version is completed in the image of the old firmware version based on the first upgrade data and the second upgrade data. In addition, in comparison with a conventional differential upgrade package, in the block differential upgrade package, a part or all of data in the conventional differential upgrade package is replaced with an operation instruction.

18 Claims, 4 Drawing Sheets

Image of an old firmware version

Image of a new firmware version

Differential upgrade package

Wireless download

Thin device on an internet of things terminal side (51) Int. Cl.
  *G06F 8/61* (2018.01)
  *G06F 8/71* (2018.01)

(56) References Cited

U.S. PATENT DOCUMENTS

| | | | |
|---|---|---|---|
| 9,804,933 B2* | 10/2017 | Wei | G06F 11/1469 |
| 10,866,797 B2* | 12/2020 | Choi | G06F 8/654 |
| 10,990,376 B2* | 4/2021 | Gandhi | G06F 8/65 |
| 2005/0223372 A1* | 10/2005 | Borchers | G06F 8/65 |
| | | | 717/168 |
| 2006/0004756 A1 | 1/2006 | Peleg et al. | |
| 2008/0028395 A1* | 1/2008 | Motta | G06F 8/65 |
| | | | 717/177 |
| 2008/0172584 A1 | 7/2008 | Meller et al. | |
| 2009/0106580 A1* | 4/2009 | Slyz | G06F 11/1433 |
| | | | 714/5.1 |
| 2009/0254897 A1* | 10/2009 | Segalov | H04M 1/0254 |
| | | | 717/173 |
| 2011/0173603 A1* | 7/2011 | Nakamura | G06F 8/66 |
| | | | 717/173 |
| 2011/0173604 A1* | 7/2011 | Nakamura | G06F 8/658 |
| | | | 717/173 |
| 2011/0179406 A1* | 7/2011 | Ohama | G06F 8/654 |
| | | | 717/168 |
| 2016/0291967 A1* | 10/2016 | Badri | G06F 8/654 |
| 2021/0109879 A1* | 4/2021 | Das Sharma | G06F 12/1072 |
| 2021/0216304 A1* | 7/2021 | Marino | H04L 67/34 |

FOREIGN PATENT DOCUMENTS

| | | | | |
|---|---|---|---|---|
| CN | 102722386 A | | 10/2012 | |
| CN | 103118198 A | | 5/2013 | |
| CN | 102132258 B | * | 5/2014 | G06F 11/1433 |
| CN | 104991790 A | | 10/2015 | |
| CN | 103473099 B | * | 2/2017 | G06F 8/665 |
| CN | 108228224 A | | 6/2018 | |
| CN | 108279922 A | * | 7/2018 | |
| CN | 108279922 A | | 7/2018 | |
| JP | H0733531 B2 | | 4/1995 | |
| JP | 3863118 B2 | * | 12/2006 | G06F 3/1204 |
| WO | 2015139381 A1 | | 9/2015 | |

OTHER PUBLICATIONS

Basnight et al., "Firmware modification attacks on programmable logic controllers", 2013, Elsevier B.V. (Year: 2013).*
Jain et al., "Infield Firmware Update: Challenges and Solutions", 2016, IEEE (Year: 2016).*
Kachman et al., "Optimized Differencing Algorithm for Firmware Updates of Low-Power Devices", 2016, IEEE (Year: 2016).*

* cited by examiner

FIRMWARE UPGRADE METHOD AND APPARATUS, AND TERMINAL

CROSS-REFERENCE TO RELATED APPLICATIONS

This application is a continuation of International Application No. PCT/CN2019/108397, filed on Sep. 27, 2019, which claims priority to Chinese Patent Application No. 201811247582.8, filed on Oct. 25, 2018. The disclosures of the aforementioned applications are hereby incorporated by reference in their entireties.

TECHNICAL FIELD

This application relates to the field of internet of things terminal technologies, and in particular, to a firmware upgrade method and apparatus, and a terminal.

BACKGROUND

The internet of things is a network extended and expanded based on the Internet, and a user end of the internet of things extends and expands to information exchange and communication between any objects. In a current internet of things service, collected data of an internet of things terminal is obtained by using an internet of things platform, and the obtained data is provided for specific internet of things services such as vehicle management, retail management, and logistics management. The internet of things platform manages the internet of things terminal, and a thin device on an internet of things terminal side is one of key devices for the management of the internet of things terminal.

Figure 1:
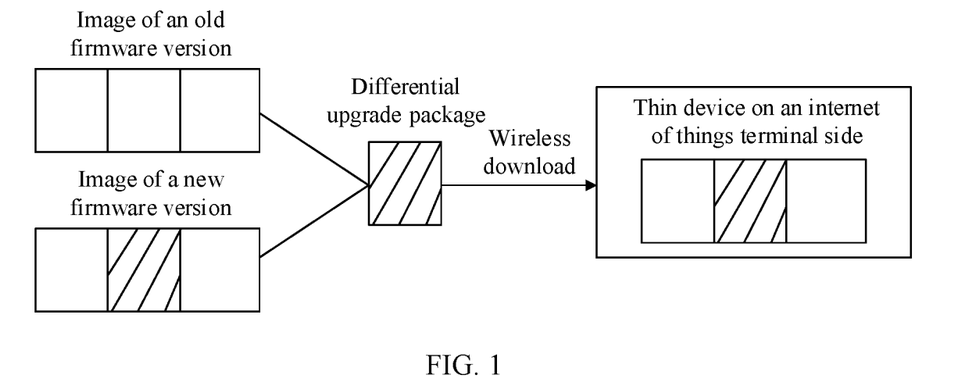
FIG. 1 is a schematic diagram of a differential upgrade method in a conventional technology.

As the internet of things service is upgraded, firmware of the thin device on the internet of things terminal side also needs to be upgraded accordingly to improve the management of the internet of things terminal. In a conventional technology, there are many firmware upgrade methods for the thin device on the internet of things terminal side, including a full image upgrade method, a compressed image upgrade method, and a differential upgrade method. The differential upgrade method has advantages such as small space signal occupation and simple implementation. Therefore, the differential upgrade method becomes one of the most commonly used firmware upgrade methods for the thin device on the internet of things terminal side. As shown in FIG. 1, a process of the differential upgrade method is as follows: A differential upgrade package is generated by using an old firmware version 1 and a new firmware version 2 in the thin device on the internet of things terminal side, the differential upgrade package is downloaded to a flash of the thin device on the internet of things terminal side, then an upgrade program is run on the thin device on the internet of things terminal side, and the old firmware version 1 is upgraded to the new firmware version 2 by using the differential upgrade package.

Although the differential upgrade method can implement the firmware upgrade of the thin device on the internet of things terminal side, in the firmware upgrade process, a comparison needs to be performed on an image of the old firmware version by using the differential upgrade package, an image of the new firmware version is obtained and stored in the flash of the thin device on the internet of things terminal side, and then, the image of the old firmware version is replaced with the image of the new firmware version to complete the upgrade. In the upgrade process, to avoid an upgrade failure caused by a power outage or the like during the upgrade process, the flash of the thin device on the internet of things terminal side needs to make a full image backup of the image of the old firmware version. Therefore, considerable flash space resources are occupied in the upgrade process.

SUMMARY

This application provides a firmware upgrade method and apparatus, and a terminal, to resolve a problem in a conventional technology that considerable flash space resources are occupied in a process of upgrading firmware of a thin device on an internet of things terminal side by using a differential upgrade method.

According to a first aspect, this application provides a firmware upgrade method, and the method includes: sequentially obtaining first upgrade data and operation instructions in all data blocks in a block differential upgrade package, where the first upgrade data is data added in an image of a new firmware version in comparison with an image of an old firmware version, and the operation instruction is used to instruct to obtain the second upgrade data based on data in the image of the old firmware version; converting, according to the operation instruction, first data indicated by the operation instruction into the second upgrade data in the image of the old firmware version; and when the first data does not exist in the image of the old firmware version, controlling the first upgrade data and the second upgrade data to overwrite a to-be-upgraded data area in the image of the old firmware version.

The first upgrade data cannot be obtained by converting any data in the image of the old firmware version. The second upgrade data is obtained by converting data (for example, the first data) in the image of the old firmware version. The first upgrade data and the second upgrade data constitute difference data of the image of the new firmware version and the image of the old firmware version.

In some implementations, the first data is any data whose dependency is not 0 in the image of the old firmware version, the dependency is used to indicate a quantity of times that the first data is required for conversion into the second upgrade data, and a dependency on the first data is updated each time one piece of second upgrade data is generated.

It should be understood that "an image of a new firmware version" herein is not additionally generated on a computer on which a firmware upgrade is completed, and is merely a target image.

In this implementation, the first data indicated by the operation instruction is converted into the second upgrade data in the image of the old firmware version according to the operation instruction in the differential upgrade package, and an operation of upgrading to the image of the new firmware version is completed in the image of the old firmware version based on the first upgrade data and the second upgrade data. The image of the new firmware version does not need to be additionally generated in an entire upgrade process, and no storage space needs to be reserved for the image of the new firmware version. In addition, in comparison with a conventional differential upgrade package, in the block differential upgrade package, a part or all of data in the conventional differential upgrade package is replaced with an operation instruction, thereby further reducing flash overheads for storing the block differential upgrade package and reducing flash space resources occupied in the upgrade process.

With reference to the first aspect, in a first possible implementation of the first aspect, the converting, according to the operation instruction, first data indicated by the operation instruction into the second upgrade data in the image of the old firmware version includes: obtaining a field range of the corresponding first data indicated by the operation instruction; determining the first data from the image of the old firmware version based on the field range; and converting the first data into the second upgrade data in the image of the old firmware version according to a conversion path in the operation instruction.

With reference to the first possible implementation of the first aspect, in a second possible implementation of the first aspect, the converting the first data into the second upgrade data in the image of the old firmware version according to a conversion path in the operation instruction includes: determining a backup area in the image of the old firmware version, where the backup area is a data area corresponding to to-be-deleted data in the image of the old firmware version; replicating the first data to the backup area; and converting the first data into the second upgrade data in the backup area according to the conversion path.

With reference to the second possible implementation of the first aspect, in a third possible implementation of the first aspect, the method further includes: if the first data exists in the to-be-upgraded data area, placing the first upgrade data in the backup area.

With reference to the second possible implementation of the first aspect, in a fourth possible implementation of the first aspect, the method further includes: if the first data exists in the to-be-upgraded data area, placing the first data in the backup area.

According to a second aspect, this application provides a firmware upgrade method, and the method includes: obtaining an initial differential upgrade package based on difference data of an image of a new firmware version and an image of an old firmware version; splitting the image of the new firmware version to obtain a first data block of a first preset length, where the first data block is any data block obtained after the image of the new firmware version is split; splitting, based on a data area corresponding to the generated first data block in the initial differential upgrade package, the initial differential upgrade package to obtain a second data block, where the second data block is any data block obtained after the initial differential upgrade package is split; determining a dependency of the second data block on each original data block in the image of the old firmware version; and updating the second data block based on the dependency to obtain a block differential upgrade package, where the updating the second data block includes: replacing a part or all of data in the second data block with an operation instruction, where the operation instruction is used to instruct to generate, based on the original data block, data that is in the second data block and that is replaced with the operation instruction.

In this implementation, the initial differential upgrade package is first split into blocks, and then a part or all of data in a data block that is in the initial differential upgrade package and that is obtained through splitting is replaced with an operation instruction, thereby reducing flash space occupied by the differential upgrade package.

With reference to the second aspect, in a first possible implementation of the second aspect, the splitting, based on a data area corresponding to the generated first data block in the initial differential upgrade package, the initial differential upgrade package to obtain a second data block includes: determining a field range corresponding to each first data block in the initial differential upgrade package; and splitting the initial differential upgrade package by using an end address of each field range as a splitting point of the initial differential upgrade package.

With reference to the first possible implementation of the second aspect, in a second possible implementation of the second aspect, the determining a dependency of the second data block on each original data block in the image of the old firmware version includes: if the part or all of the data in the second data block can be obtained based on the original data block, updating the dependency on the original data block, where the data in the second data block can be obtained by using one or more original data blocks.

With reference to the second possible implementation of the second aspect, in a third possible implementation of the second aspect, the updating the second data block based on the dependency includes: determining the operation instruction corresponding to the part or all of the data that is in the second data block and that is obtained based on the original data block, where the operation instruction includes one or more of the following: translating the original data block to a specified field location, deleting data in a preset area of the original data block, and transforming the original data block based on a specified path; and adding the operation instruction to the second data block and deleting the part or all of the data.

With reference to the third possible implementation of the second aspect, in a fourth possible implementation of the second aspect, the method further includes: updating the dependency on the original data block each time one second data block is updated.

According to a third aspect, this application provides a firmware upgrade apparatus, and the apparatus includes: an obtaining module, configured to sequentially obtain first upgrade data and operation instructions in all data blocks in a block differential upgrade package, where the first upgrade data is data added in an image of a new firmware version in comparison with an image of an old firmware version, the first upgrade data cannot be obtained by using the image of the old firmware version, the operation instruction is used to instruct to obtain the second upgrade data based on data in the image of the old firmware version, and the first upgrade data and the second upgrade data constitute difference data of the image of the new firmware version and the image of the old firmware version; a data conversion module, configured to convert, according to the operation instruction, first data indicated by the operation instruction into the second upgrade data in the image of the old firmware version, where the first data is any data whose dependency is not 0 in the image of the old firmware version, the dependency is used to indicate a quantity of times that the first data is required for conversion into the second upgrade data, and a dependency on the first data is updated each time one piece of second upgrade data is generated; and an upgrade module, configured to: when the first data does not exist in a to-be-upgraded data area in the image of the old firmware version, control the difference data to overwrite the to-be-upgraded data area.

With reference to the third aspect, in a first possible implementation of the third aspect, the data conversion module includes: an obtaining unit, configured to obtain a field range of the corresponding first data indicated by the operation instruction; a determining unit, configured to determine the first data from the image of the old firmware version based on the field range; and a data conversion unit, configured to convert the first data into the second upgrade data in the image of the old firmware version according to a conversion path in the operation instruction.

With reference to the first possible implementation of the third aspect, in a second possible implementation of the third aspect, the data conversion unit includes: a determining subunit, configured to determine a backup area in the image of the old firmware version, where the backup area is a data area corresponding to to-be-deleted data in the image of the old firmware version; a data translation subunit, configured to replicate the first data to the backup area; and a data conversion subunit, configured to convert the first data into the second upgrade data in the backup area according to the conversion path.

With reference to the second possible implementation of the third aspect, in a third possible implementation of the third aspect, the apparatus further includes: a first data backup unit, configured to: if the first data exists in the to-be-upgraded data area, place the first upgrade data in the backup area.

With reference to the second possible implementation of the third aspect, in a fourth possible implementation of the third aspect, the apparatus further includes: a second data backup unit, configured to: if the first data exists in the to-be-upgraded data area, place the first data in the backup area.

According to a fourth aspect, this application provides a firmware upgrade apparatus, and the apparatus includes: an obtaining module, configured to obtain an initial differential upgrade package based on difference data of an image of a new firmware version and an image of an old firmware version; a first splitting module, configured to split the image of the new firmware version to obtain a first data block of a first preset length, where the first data block is any data block obtained after the image of the new firmware version is split; a second splitting module, configured to split, based on a data area corresponding to the generated first data block in the initial differential upgrade package, the initial differential upgrade package to obtain a second data block, where the second data block is any data block obtained after the initial differential upgrade package is split; a determining module, configured to determine a dependency of the second data block on each original data block in the image of the old firmware version; and an update module, configured to update the second data block based on the dependency to obtain a block differential upgrade package, where the updating the second data block includes: replacing a part or all of data in the second data block with an operation instruction, where the operation instruction is used to instruct to generate, based on the original data block, data that is in the second data block and that is replaced with the operation instruction.

With reference to the fourth aspect, in a first possible implementation of the fourth aspect, the second splitting module includes: a first determining unit, configured to determine a field range corresponding to each first data block in the initial differential upgrade package; and a splitting unit, configured to split the initial differential upgrade package by using an end address of each field range as a splitting point of the initial differential upgrade package.

With reference to the first possible implementation of the fourth aspect, in a second possible implementation of the fourth aspect, the determining module includes: a first dependency update unit, configured to: if the part or all of the data in the second data block can be obtained based on the original data block, update the dependency on the original data block, where the data in the second data block can be obtained by using one or more original data blocks.

With reference to the second possible implementation of the fourth aspect, in a third possible implementation of the fourth aspect, the update module includes: a third determining unit, configured to determine a dependency on the third data block and a dependency attribute when the first data block is obtained through an update based on the second data block, where the dependency attribute includes one or more of the following: deletion, translation, and transformation; an instruction generation unit, configured to generate an operation instruction according to the dependency and the dependency attribute, where the dependency on the third data block is decreased by 1 each time an operation instruction is generated based on the third data block; and an update unit, configured to add the operation instruction to the second data block and delete data associated with the third data block, where the data associated with the third data block is data obtained according to the operation instruction and the third data block.

With reference to the third possible implementation of the fourth aspect, in a fourth possible implementation of the fourth aspect, the apparatus further includes: a second dependency update unit, configured to update the dependency on the original data block each time one second data block is updated.

According to a fifth aspect, this application provides a terminal, including: a processor; and a memory, configured to store a computer executable instruction, where when executing the computer executable instruction, the processor performs the method in any one of the first aspect and the possible implementations of the first aspect, to complete an in-place differential upgrade based on an obtained block differential upgrade package and an image of an old firmware version to obtain an image of a new firmware version.

According to a sixth aspect, this application provides a terminal, including: a processor; and a memory, configured to store a computer executable instruction, where when executing the computer executable instruction, the processor performs the method in any one of the second aspect and the possible implementations of the second aspect, to generate a block differential upgrade package based on an image of a new firmware version and an image of an old firmware version.

According to a seventh aspect, this application provides a computer storage medium, including a computer readable instruction, where after being executed by one or more processors, the computer readable instruction is used to implement the method in any one of the first aspect and the possible implementations of the first aspect.

According to an eighth aspect, this application provides a computer storage medium, including a computer readable instruction, where after being executed by one or more processors, the computer readable instruction is used to implement the method in any one of the second aspect and the possible implementations of the second aspect.

BRIEF DESCRIPTION OF DRAWINGS

To describe the technical solutions in this application more clearly, the following briefly describes the accompanying drawings for describing the embodiments. Apparently, a person of ordinary skill in the art may derive other drawings from these accompanying drawings without creative efforts.

DESCRIPTION OF EMBODIMENTS

To make a person skilled in the art understand the technical solutions in the embodiments of this application better, the following further describes the technical solutions in the embodiments of this application in detail with reference to the accompanying drawings.

To better describe the technical solutions provided in this application, a terminal that generates a block differential upgrade package and a terminal that performs an in-place differential upgrade based on the differential upgrade package in an embodiment of this application are first described. In this embodiment, the terminal that generates the differential upgrade package is a PC production end, and the terminal that performs the in-place differential upgrade based on the differential upgrade package is a thin device on an internet of things terminal side. The PC production end stores an image of a current old firmware version of the thin device on the internet of things terminal side and an image of a new firmware version that needs to be updated, and generates the block differential upgrade package by using the image of the old firmware version and the image of the new firmware version. The PC production end uploads the generated block differential upgrade package to a server. When the thin device on the internet of things terminal side needs to perform a firmware version upgrade, the thin device on the internet of things terminal side downloads the block differential upgrade package from the server, and implements the in-place differential upgrade based on the block differential upgrade package and the image of the old firmware version in a current device, to upgrade the old firmware version of the thin device on the internet of things terminal side to the new firmware version.

Figure 2:
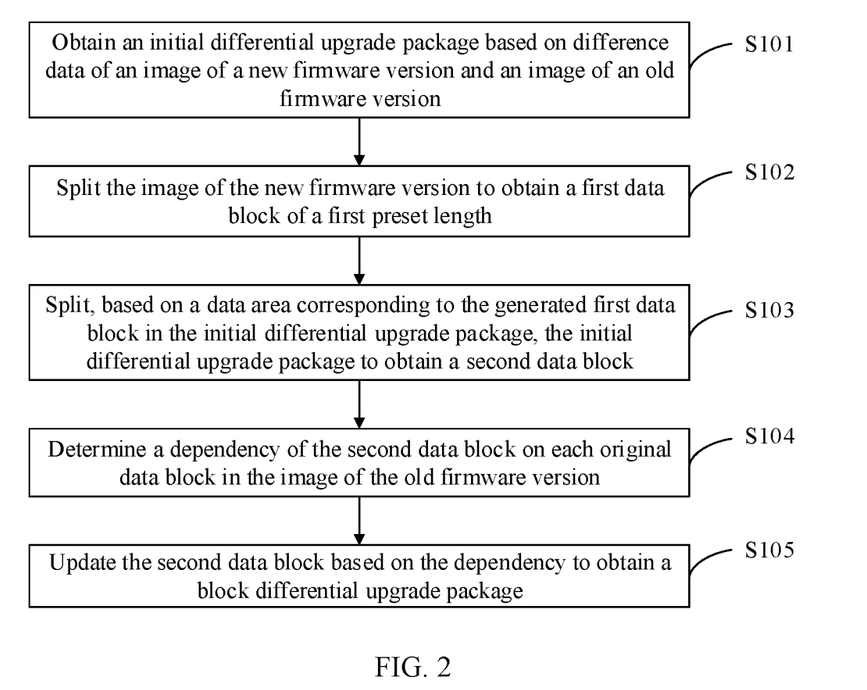
FIG. 2 is a schematic flowchart of a firmware upgrade method according to an embodiment of this application.

FIG. 2 is a schematic flowchart of a firmware upgrade method according to an embodiment of this application. Referring to FIG. 2, the firmware upgrade method includes the following steps.

S101. Obtain an initial differential upgrade package based on difference data of an image of a new firmware version and an image of an old firmware version.

In this embodiment, a production end compares the image of the new firmware version with the image of the old firmware version, determines the difference data of the image of the new firmware version and the image of the new firmware version, and generates the initial differential upgrade package based on the difference data. In other words, a currently generated differential upgrade package is consistent with a conventional differential upgrade package. Data carried in the differential upgrade package represents only a difference between the image of the new firmware version and the image of the old firmware version. The initial differential upgrade package may obtain the image of the new firmware version based on the difference data in the initial differential upgrade package and the image of the old firmware version.

S102. Split the image of the new firmware version to obtain a first data block of a first preset length.

Although the difference data carried in the initial differential upgrade package generated in S101 may represent the difference between the image of the new firmware version and the image of the old firmware version, there may be two different types of difference data. One type of difference data is data added in the image of the new firmware version in comparison with the image of the old firmware version, and the difference data cannot be obtained based on data in the image of the old firmware version. The other type of difference data is also data added in the image of the new firmware version in comparison with the image of the old firmware version, but may be obtained by converting the data in the image of the old firmware version. If the initial differential upgrade package carries the latter type of difference data, a part corresponding to this type of data in the differential upgrade package may be replaced with an operation instruction, so that a data length of the initial differential upgrade package can be reduced.

Therefore, in this embodiment, after the initial differential upgrade package is obtained, the image of the new firmware version is split based on a preset length, and the image of the new firmware version is split into a plurality of first data blocks. The first data block is any data block obtained after the new firmware version is split. In this embodiment, the preset length for splitting the image of the new firmware version may be set based on an actual requirement, for example, may be set to 2 M, 4 M, 8 M, or 16 M. A specific length for the splitting is determined based on a length of the image of the new firmware version, and is not specifically limited in this embodiment.

Figure 3:
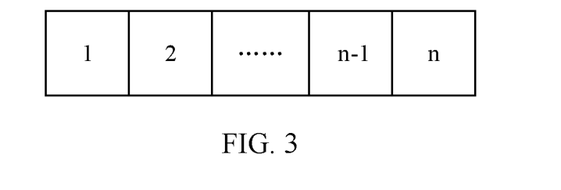
FIG. 3 is a schematic diagram of adding a block identifier to a data block according to an embodiment of this application.

After the image of the new firmware version is split, a block identifier is added to each first data block, and the block identifier is used to determine an order relationship of each first data block in the image of the new firmware version. As shown in FIG. 3, the image of the new firmware version is split from an image file header location. After the splitting, a block identifier 1 is added to a first data block corresponding to the image file header location, to indicate that the first data block is at the file header location in the image of the new firmware version. Correspondingly, block identifiers 2, 3, . . . , and n are sequentially added to subsequent first data blocks, and a first data block corresponding to the block identifier n is a file end location in the image of the new firmware version.

S103. Split, based on a data area corresponding to the generated first data block in the initial differential upgrade package, the initial differential upgrade package to obtain a second data block.

In S102, the image of the new firmware version is split. To analyze the difference data in the initial differential data packet, it is determined whether the difference data may be obtained by converting the data in the image of the old firmware version. In this embodiment, the initial differential upgrade package is further split.

The splitting of the image of the new firmware version is equal-length splitting, and lengths of all first data blocks are the same. However, when the image of the new firmware version is generated by using the initial differential upgrade package and the old firmware version, the generated first data blocks may correspond to different data in the initial differential upgrade package. For example, if a length for splitting the image of the new firmware version is 100 M, the image of the new firmware version is split into 10 first data blocks based on a preset length of 10 M. The initial differential upgrade package is 20 M and corresponds to 10 first data blocks, and the initial differential upgrade package needs to be split into 10 blocks. It is assumed that data of the 1st data block generated in the initial differential upgrade package may be 3 M. Therefore, if the initial differential upgrade package is split based on an equal length, a data block obtained after the initial differential upgrade package is split cannot correspond to the first data block. Therefore, in this embodiment, the initial differential upgrade package is split, based on the data area corresponding to the generated first data block in the initial differential upgrade package, to obtain the second data block, and the second data block is any data block obtained after the initial differential upgrade package is split. Correspondingly, after the initial differential upgrade package is split, a block identifier is also added to each second data block. An allocation rule of adding the block identifier is consistent with that of adding the block identifier to the first data block, to ensure that a block identifier of a second data block corresponding to the generated first data block whose block identifier is 1 is also 1.

Figure 4:
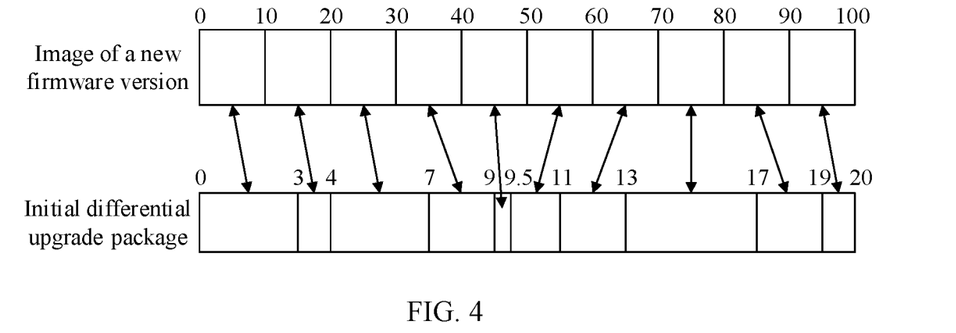
FIG. 4 is a schematic diagram obtained after an initial differential upgrade package is split according to an embodiment of this application.

Specifically, field ranges corresponding to the generated first data blocks in the initial differential upgrade package are sequentially determined based on block identifiers of the first data blocks, an end address of each field range is used as a splitting point of the initial differential upgrade package, and the initial differential upgrade package is split into a plurality of second data blocks. As shown in FIG. 4, if a length for splitting the image of the new firmware version is 100 M, the image of the new firmware version is split based on a preset length of 10 M, to obtain 10 first data blocks whose lengths are 10 M. The initial differential upgrade package is 20 M, and field ranges corresponding to the 1st first data block to the 10th first data block in the initial differential upgrade package are sequentially 0-3 M, 3-4 M, 4-7 M, 7-9 M, 9-9.5 M, 9.5-11 M, 11-13 M, 13-17 M, 17-19 M, and 19-20 M. It can be learned from the foregoing description that based on the block identifiers of the first data blocks, lengths of data areas corresponding to the generated first data blocks in the initial differential upgrade package are sequentially 3 M, 1 M, 3 M, 2 M, 0.5 M, 1.5 M, 2 M, 4 M, 2 M, and 1 M. Therefore, after the initial differential upgrade package is split, corresponding lengths of second data blocks based on block identifiers are sequentially 3 M, 1 M, 3 M, 2 M, 0.5 M, 1.5 M, 2 M, 4 M, 2 M, and 1 M.

S104. Determine a dependency of the second data block on each original data block in the image of the old firmware version.

After the initial differential upgrade package is split, it is determined whether a part or all of data in the obtained second data block depends on the original data block in the image of the old firmware version. A length of the original data block is uncertain.

If a part of data in the 1st second data block may be obtained by converting an original data block whose field range is 2-3 M in the image of the old firmware version, the length of the original data block is 1 M. A part of data in the 2nd second data block may be obtained by converting two original data blocks whose field ranges are 2-3 M and 5-7 M in the image of the old firmware version. It can be learned from the foregoing description that a length of an original data block is uncertain, and a dependency on a same original data block also varies.

The original data block whose field range is 2-3 M in the image of the old firmware version needs to be used twice, and therefore a dependency is 2. The original data block whose field range is 5-7 M in the image of the old firmware version is used once, and therefore a dependency is 1. If the original data block whose field range is 2-3 M in the image of the old firmware version is still to be used subsequently, the dependency on the original data block is increased by 1, until all second data blocks are determined.

S105. Update the second data block based on the dependency to obtain a block differential upgrade package.

An operation instruction corresponding to the part or all of the data that is in the second data block and that is obtained based on the original data block is determined before each second data block is updated. The operation instruction includes: translating the original data block to a specified field location, where the part or all of the data in the second data block is just data corresponding to an original data block and is obtained only through translation; deleting data in a preset area of the original data block, where the part or all of the data in the second data block needs to be deleted based on a part of data in an original data block, and then remaining data is spliced to obtain the second data block; and transforming the original data block based on a specified path, where the part or all of the data in the second data block needs to be obtained by changing data in the original data block.

After the operation instruction corresponding to the part or all of the data that is in the second data block and that is obtained based on the original data block is determined, the part or all of the data in the second data block is deleted and replaced with the operation instruction. The dependency on the original data block changes each time one second data block is updated. Therefore, a dependency on each original data block needs to be updated.

In an example embodiment, if a length of the 1st second data block is 3 M, and data of 2 M in the second data block may be obtained by performing data transformation based on an original data block whose field range is 5-7 M in the image of the old firmware version, the corresponding data of 2 M in the second data block is deleted, and an instruction is added to delete the data of 2 M that may be obtained by performing data transformation on the original data block whose field range is 5-7 M in the image of the old firmware version. In this case, the length of the second data block changes from 3 M to approximately 1 M, so that an amount of data in the differential upgrade package is reduced, but a subsequent upgrade is not affected.

It can be learned from the foregoing embodiment that in the firmware upgrade method provided in this embodiment, the initial differential upgrade package is first split into blocks, and then a part or all of data in a data block that is in the initial differential upgrade package and that is obtained through splitting is replaced with an operation instruction, thereby reducing flash space occupied by the differential upgrade package.

Corresponding to the firmware upgrade method provided in the foregoing embodiment in which a block differential upgrade package is generated, this application further provides another firmware upgrade method, so that after obtaining the block differential upgrade package, a terminal device performs a firmware upgrade based on the block differential upgrade package, to upgrade an old firmware version in the terminal device to a new firmware version.

Figure 5:
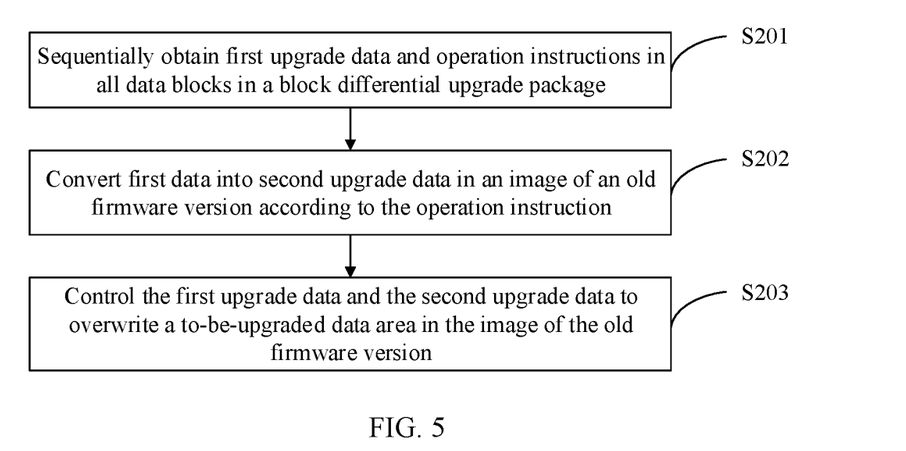
FIG. 5 is a schematic flowchart of another firmware upgrade method according to an embodiment of this application.

FIG. 5 shows another firmware upgrade method according to an embodiment of this application. The firmware upgrade method includes the following steps.

S201. Sequentially obtain first upgrade data and operation instructions in all data blocks in a block differential upgrade package.

In the block differential upgrade package generated in the foregoing embodiment, each block in the block differential upgrade package is updated to reduce an amount of data in the block differential upgrade, but at least it is ensured that a terminal can complete a normal firmware upgrade by using the differential upgrade package.

If first upgrade data exists in a data block in the block differential upgrade package, it indicates that the first upgrade data is data added in an image of a new firmware version in comparison with an image of an old firmware version, and the first upgrade data cannot be obtained by performing any operation by using data in the image of the old firmware version. The operation instruction is used to indicate that the second upgrade data may be obtained based on the data in the image of the old firmware version. In an initial state, a data block in the block differential upgrade package needs to include both the first upgrade data and the second upgrade data. However, because the second upgrade data may be obtained based on the data in the image of the old firmware version, the second upgrade data is replaced with the operation instruction. The first upgrade data and the second upgrade data constitute difference data of the image of the new firmware version and the image of the old firmware version, and the image of the new firmware version may be obtained based on the difference data and the image of the old firmware version.

S202. Convert first data into the second upgrade data in the image of the old firmware version according to the operation instruction.

In this embodiment, the first data is any data whose dependency is not 0 in the image of the old firmware version, and the dependency is used to indicate a quantity of times that the first data is required for conversion into the second upgrade data. For example, if a same piece of first data needs to be used to obtain second upgrade data in each of three data blocks in the block differential upgrade package through conversion, a dependency on the first data is 3.

To obtain the second upgrade data, a field range of the first data that is indicated by the operation instruction and that is required for obtaining the second upgrade data in the image of the old firmware version is first obtained from the operation instruction. The first data is determined from the image of the old firmware version based on the field range, and the first data is converted into the second upgrade data in the image of the old firmware version according to a conversion path in the operation instruction.

Because obtaining of the second upgrade data through conversion based on the first data is completed in the image of the old firmware version, if an operation is directly performed on the first data, an original data structure of the first data and a field location of the first data may be damaged. Therefore, in this embodiment, a backup area is determined in the image of the old firmware version, and the backup area is a data area corresponding to to-be-deleted data in the image of the old firmware version. Specifically, the to-be-deleted data is data that is not required by the image of the old firmware version in comparison with the image of the new firmware version, and this part of data needs to be overwritten by upgrade data. The first data is replicated to the backup area, and the first data is converted into the second upgrade data in the backup area according to the conversion path. A dependency on the first data needs to be updated each time one piece of second upgrade data is generated.

In an example embodiment, a data block in the block differential upgrade package includes first upgrade data of 1 M and an operation instruction, and the operation instruction is to delete data of 6-6.5 M in data corresponding to a field range of 5-7 M in the image of the old firmware version, perform data splicing on remaining data at two ends to obtain second upgrade data, overwrite a field range of 5-6.5 M in the image of the old firmware version with the second upper-level data, and overwrite a field range of 6.5-7.5 M in the image of the old firmware version with the first upgrade data. In this case, a data deletion operation needs to be first performed on first data corresponding to the field range of 5-7 M in the image of the old firmware version. However, if a dependency on the first data is 3, the first data is still to be used subsequently. Therefore, the first data is replicated to the backup area for an operation. In this way, the corresponding second upgrade data can be obtained, and an original structure of the first data is not damaged.

S203. Control the first upgrade data and the second upgrade data to overwrite a to-be-upgraded data area in the image of the old firmware version.

It can be learned from the foregoing description that the second upgrade data is generated in the backup area, the second upgrade data may be directly translated to a specified field location in the image of the old firmware version, and the first upgrade data may also be obtained from a data block in the block differential upgrade package. However, first, it needs to be ensured that no first data exists in the to-be-upgraded data area to be overwritten by the first upgrade data and the second upgrade data. If the first data exists, a subsequent upgrade cannot be ensured after the first data is overwritten.

In an example embodiment, a data block in the block differential upgrade package includes first upgrade data of 1 M and an operation instruction, and the operation instruction is to overwrite a field range of 10-12 M in the image of the old firmware version with data corresponding to a field range of 3-5 M in the image of the old firmware version through translation, and overwrite a field range of 12-13 M in the image of the old firmware version with the first upgrade data of 1 M. Therefore, in this embodiment, the data corresponding to the field range of 3-5 M in the image of the old firmware version is second upgrade data, and is data existing in the image of the old firmware version, but corresponds to a field range of 12-13 M in the image of the new firmware version. However, if other first data exists in the field range of 12-13 M in the image of the old firmware version, the other first data is overwritten due to direct translation.

Therefore, in this embodiment, first data corresponding to the field range of 3-5 M in the image of the old firmware version is first replicated to the backup area. In this way, a case in which a firmware upgrade cannot be smoothly performed due to direct translation if the first data is still required subsequently can be avoided. In addition, a case in which a subsequent firmware upgrade cannot be smoothly performed because other first data is overwritten due to direct translation can be avoided.

If first data exists in the field range of 10-12 M in the image of the old firmware version, and a dependency on the first data corresponding to the field range of 3-5 M in the image of the old firmware version is 1, the dependency changes to 0 after the translation. Alternatively, the first data corresponding to the field range of 10-12 M in the image of the old firmware version may be translated to the backup area for storage, and a current field range of the first data corresponding to the original field range of 10 M-12 M in the image of the old firmware version is recorded. For example, if a field range in the backup area is a field range of 60-70 M in the image of the old firmware version, first data corresponding to the original field range of 12-13 M in the image of the old firmware version may be translated to a field range of 60-62 M in the image of the old firmware version.

After the second upgrade data is generated in the backup area, if it is determined that the first data does not exist in the to-be-upgraded data area in the image of the old firmware version corresponding to the first upgrade data and the second upgrade data, the to-be-upgraded data area is directly overwritten with the difference data constituted by the first upgrade data and the second upgrade data, to upgrade a part of data in the image of the old firmware version, until corresponding upgrades on all to-be-upgraded data areas in the image of the old firmware version are completed. In this case, the image of the old firmware version smoothly changes to the image of the new firmware version, and old firmware in the terminal is upgraded to new firmware.

It can be learned from the foregoing embodiment that in the firmware upgrade method provided in this embodiment, the first data indicated by the operation instruction is converted into the second upgrade data in the image of the old firmware version according to the operation instruction in the differential upgrade package, and an operation of upgrading to the image of the new firmware version is completed in the image of the old firmware version based on the first upgrade data and the second upgrade data. The image of the new firmware version does not need to be additionally generated in an entire upgrade process, and no storage space needs to be reserved for the image of the new firmware version. In addition, in comparison with a conventional differential upgrade package, in the block differential upgrade package, a part or all of data in the conventional differential upgrade package is replaced with an operation instruction, thereby further reducing flash overheads for storing the block differential upgrade package and reducing flash space resources occupied in the upgrade process.

Figure 6:
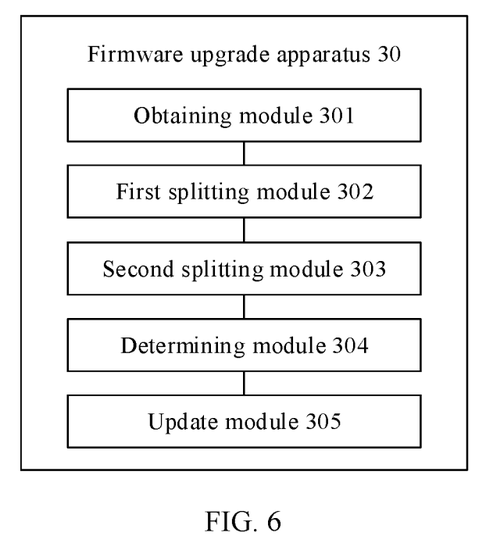
FIG. 6 is a schematic diagram of a firmware upgrade apparatus according to an embodiment of this application.

Corresponding to the firmware upgrade method provided in the foregoing embodiment, an embodiment of this application further provides a firmware upgrade apparatus. FIG. 6 is a schematic diagram of a firmware upgrade apparatus according to an embodiment of this application. Referring to FIG. 6, a firmware upgrade apparatus 30 includes an obtaining module 301, a first splitting module 302, a second splitting module 303, a determining module 304, and an update module 305.

The obtaining module 301 is configured to obtain an initial differential upgrade package based on difference data of an image of a new firmware version and an image of an old firmware version. The first splitting module 302 is configured to split the image of the new firmware version to obtain a first data block of a first preset length, where the first data block is any data block obtained after the image of the new firmware version is split. The second splitting module 303 is configured to split, based on a data area corresponding to the generated first data block in the initial differential upgrade package, the initial differential upgrade package to obtain a second data block, where the second data block is any data block obtained after the initial differential upgrade package is split. The determining module 304 is configured to determine a dependency of the second data block on each original data block in the image of the old firmware version.

The update module 305 is configured to update the second data block based on the dependency to obtain a block differential upgrade package, where the updating the second data block includes: replacing a part or all of data in the second data block with an operation instruction, where the operation instruction is used to instruct to generate, based on the original data block, data that is in the second data block and that is replaced with the operation instruction In an example embodiment, the second splitting module 303 includes a first determining unit and a splitting unit.

The first determining unit is configured to determine a field range corresponding to each first data block in the initial differential upgrade package. The splitting unit is configured to split the initial differential upgrade package by using an end address of each field range as a splitting point of the initial differential upgrade package.

The determining module 304 includes a first dependency update unit, configured to: if the part or all of the data in the second data block can be obtained based on the original data block, update the dependency on the original data block, where the data in the second data block can be obtained by using one or more original data blocks.

The update module 305 includes a second determining unit and an update unit.

The second determining unit is configured to determine the operation instruction corresponding to the part or all of the data that is in the second data block and that is obtained based on the original data block, where the operation instruction includes one or more of the following: translating the original data block to a specified field location, deleting data in a preset area of the original data block, and transforming the original data block based on a specified path. The update unit is configured to add the operation instruction to the second data block and delete the part or all of the data.

The firmware upgrade apparatus 30 provided in this embodiment of this application further includes: a second dependency update unit, configured to update the dependency on the original data block each time one second data block is updated.

According to the firmware upgrade apparatus provided in this embodiment of this application, a part or all of data in a data block that is in the initial differential upgrade package and that is obtained through splitting is replaced with an operation instruction, thereby reducing flash space occupied by the differential upgrade package.

Figure 7:
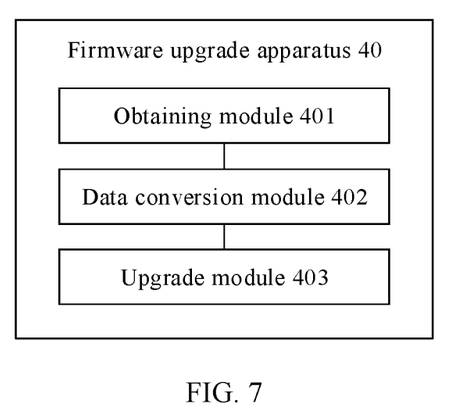
FIG. 7 is a schematic diagram of another firmware upgrade apparatus according to an embodiment of this application.

Corresponding to the another firmware upgrade method provided in the foregoing embodiment, an embodiment of this application further provides another firmware upgrade apparatus. FIG. 7 is a schematic diagram of another firmware upgrade apparatus according to an embodiment of this application. Referring to FIG. 7, a firmware upgrade apparatus 40 includes an obtaining module 401, a data conversion module 402, and an upgrade module 403.

The obtaining module 401 is configured to sequentially obtain first upgrade data and operation instructions in all data blocks in a block differential upgrade package, where the first upgrade data is data added in an image of a new firmware version in comparison with an image of an old firmware version, the first upgrade data cannot be obtained by using the image of the old firmware version, the operation instruction is used to instruct to obtain second upgrade data based on data in the image of the old firmware version, and the first upgrade data and the second upgrade data constitute difference data of the image of the new firmware version and the image of the old firmware version. The data conversion module 402 is configured to convert, according to the operation instruction, first data indicated by the operation instruction into the second upgrade data in the image of the old firmware version, where the first data is any data whose dependency is not 0 in the image of the old firmware version, the dependency is used to indicate a quantity of times that the first data is required for conversion into the second upgrade data, and a dependency on the first data is updated each time one piece of second upgrade data is generated. The upgrade module 403 is configured to: when the first data does not exist in a to-be-upgraded data area in the image of the old firmware version, control the difference data to overwrite the to-be-upgraded data area.

In an example embodiment, the data conversion module includes an obtaining unit, a determining unit, and a data conversion unit.

The obtaining unit is configured to obtain a field range of the corresponding first data indicated by the operation instruction. The determining unit is configured to determine the first data from the image of the old firmware version based on the field range. The data conversion unit is configured to convert the first data into the second upgrade data in the image of the old firmware version according to a conversion path in the operation instruction.

The data conversion unit includes a determining subunit, a data translation subunit, and a data conversion subunit.

The determining subunit is configured to determine a backup area in the image of the old firmware version, where the backup area is a data area corresponding to to-be-deleted data in the image of the old firmware version. The data translation subunit is configured to replicate the first data to the backup area. The data conversion subunit is configured to convert the first data into the second upgrade data in the backup area according to the conversion path.

The firmware upgrade apparatus 40 provided in this embodiment of this application further includes a first data backup unit and a second data backup unit.

The first data backup unit is configured to: if the first data exists in the to-be-upgraded data area, place the first upgrade data in the backup area.

The second data backup unit is configured to: if the first data exists in the to-be-upgraded data area, place the first data in the backup area.

According to the firmware upgrade apparatus provided in this embodiment of this application, the obtaining module 401 obtains the first upgrade data and the operation instruction, the data conversion module 402 converts the first data indicated by the operation instruction into the second upgrade data in the image of the old firmware version, and the upgrade module 403 completes an operation of upgrading to the image of the new firmware version in the image of the old firmware version based on the first upgrade data and the second upgrade data. The image of the new firmware version does not need to be additionally generated in an entire upgrade process, and no storage space needs to be reserved for the image of the new firmware version. In addition, in comparison with a conventional differential upgrade package, in the block differential upgrade package, a part or all of data in the conventional differential upgrade package is replaced with an operation instruction, thereby further reducing flash overheads for storing the block differential upgrade package and reducing flash space resources occupied in the upgrade process.

Figure 8:
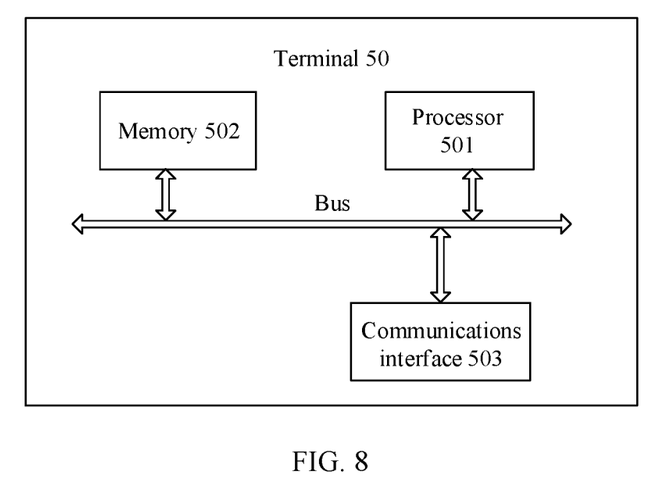
FIG. 8 is a schematic structural diagram of a terminal according to an embodiment of this application.

FIG. 8 is a schematic structural diagram of a terminal according to an embodiment of this application. Referring to FIG. 8, a terminal 50 includes a processor 501, a memory 502, and a communications interface 503.

The memory 502 is configured to store a computer executable instruction. When executing the computer executable instruction, the processor 501 performs the following operations:

obtaining an initial differential upgrade package based on difference data of an image of a new firmware version and an image of an old firmware version;

splitting the image of the new firmware version to obtain a first data block of a first preset length;

splitting, based on a data area corresponding to the generated first data block in the initial differential upgrade package, the initial differential upgrade package to obtain a second data block;

determining a dependency of the second data block on each original data block in the image of the old firmware version; and updating the second data block based on the dependency to obtain a block differential upgrade package.

The processor 501, the memory 502, and the communications interface 503 may be connected to each other through a bus. The bus may be classified into an address bus, a data bus, a control bus, and the like. For ease of representation, only one thick line is used to represent the bus in FIG. 8, but this does not mean that there is only one bus or only one type of bus.

The processor 501 may be a general purpose processor, for example, a central processing unit (CPU for short), a network processor (NP for short), or a combination of a CPU and an NP. The processor may be alternatively a microprocessor (MCU). The processor may further include a hardware chip. The hardware chip may be an application-specific integrated circuit (ASIC), a programmable logic device (PLD), or a combination thereof. The PLD may be a complex programmable logic device (CPLD), a field programmable gate array (FPGA), or the like.

The memory 502 may be implemented by any type of volatile or non-volatile storage device or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic disk, or an optical disc.

The communications interface 503 is used by the terminal 50 to upload the generated block differential upgrade package to a server. The communications interface includes a wired communications interface, and may further include a wireless communications interface. The wired communications interface includes a PLC interface, and may further include an Ethernet interface. The wireless communications interface may be a WLAN interface, a cellular network communications interface, a combination thereof, or the like.

The terminal 50 may further include a power supply component, configured to supply power to various components of the PLC chip. The power supply component may include a power supply management system and one or more power supplies.

Figure 9:
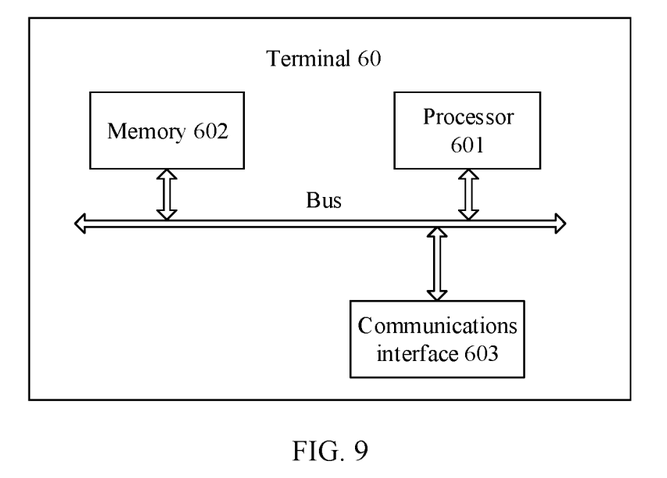
FIG. 9 is a schematic structural diagram of another terminal according to an embodiment of this application.

FIG. 9 is a schematic structural diagram of another terminal according to an embodiment of this application. Referring to FIG. 9, a terminal 60 includes a processor 601, a memory 602, and a communications interface 603.

The memory 602 is configured to store a computer executable instruction. When executing the computer executable instruction, the processor 601 performs the following operations:

sequentially obtaining first upgrade data and operation instructions in all data blocks in a block differential upgrade package, where the first upgrade data is data added in an image of a new firmware version in comparison with an image of an old firmware version, and the operation instruction is used to instruct to obtain second upgrade data based on data in the image of the old firmware version;

converting first data into the second upgrade data in the image of the old firmware version according to the operation instruction, where the first data is data in the image of the old firmware version; and controlling the first upgrade data and the second upgrade data to overwrite a to-be-upgraded data area in the image of the old firmware version.

The processor 601, the memory 602, and the communications interface 603 may be connected to each other through a bus. The bus may be classified into an address bus, a data bus, a control bus, and the like. For ease of representation, only one thick line is used to represent the bus in FIG. 9, but this does not mean that there is only one bus or only one type of bus.

The processor 601 in the foregoing embodiment may be a general purpose processor, for example, a central processing unit (CPU for short), a network processor (NP for short), or a combination of a CPU and an NP. The processor may be alternatively a microprocessor (MCU). The processor may further include a hardware chip. The hardware chip may be an application-specific integrated circuit (ASIC), a programmable logic device (PLD), or a combination thereof. The PLD may be a complex programmable logic device (CPLD), a field programmable gate array (FPGA), or the like.

The memory 602 may be implemented by any type of volatile or non-volatile storage device or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic disk, or an optical disc.

The communications interface 603 is used by the terminal 60 to download the block differential upgrade package to implement a firmware version upgrade. The communications interface includes a wired communications interface, and may further include a wireless communications interface. The wired communications interface includes a PLC interface, and may further include an Ethernet interface. The wireless communications interface may be a WLAN interface, a cellular network communications interface, a combination thereof, or the like.

The terminal 60 may further include a power supply component, configured to supply power to various components of the PLC chip. The power supply component may include a power supply management system and one or more power supplies.

It should be noted that in this specification, relational terms such as first and second are only used to distinguish one entity or operation from another, and do not necessarily require or imply that any actual relationship or sequence exists between these entities or operations. Moreover, the terms "include", "comprise", or any other variants are intended to cover a non-exclusive inclusion, so that a process, a method, an article, or a device that includes a list of elements not only includes those elements but also includes other elements that are not expressly listed, or further includes elements inherent to such a process, a method, an article, or a device. An element preceded by "includes a . . . " does not, without more constraints, preclude the presence of additional identical elements in the process, method, article, or device that includes the element.

For same or similar parts in the embodiments in this specification, reference may be made to these embodiments, and each embodiment focuses on a difference from other embodiments. Especially, apparatus and terminal embodiments are basically similar to a method embodiment, and therefore is described briefly; for related parts, reference may be made to partial descriptions in the method embodiment.

The foregoing descriptions are implementation manners of this application, but are not intended to limit the protection scope of this application.

What is claimed is:

1. A firmware upgrade method, wherein the method comprises:

sequentially obtaining first upgrade data and operation instructions in all data blocks in a block differential upgrade package, wherein the first upgrade data is data added in an image of a new firmware version in comparison with an image of an old firmware version, and the operation instruction is used to instruct to obtain second upgrade data based on data in the image of the old firmware version;

determining a field range corresponding to each first data block from among all the data blocks in the block differential upgrade package;

splitting the block differential upgrade package using an end address of each field range as a splitting point of the block differential upgrade package;

converting first data into the second upgrade data in the image of the old firmware version according to the operation instruction, wherein the first data is data in the image of the old firmware version; and controlling the first upgrade data and the second upgrade data to overwrite a to-be-upgraded data area in the image of the old firmware version.

2. The method according to claim 1, wherein the converting first data into the second upgrade data in the image of the old firmware version according to the operation instruction comprises:

obtaining a field range of the corresponding first data indicated by the operation instruction;

determining the first data from the image of the old firmware version based on the field range; and converting the first data into the second upgrade data in the image of the old firmware version according to a conversion path in the operation instruction.

3. The method according to claim 2, wherein the converting the first data into the second upgrade data in the image of the old firmware version according to a conversion path in the operation instruction comprises:

determining a backup area in the image of the old firmware version, wherein the backup area is a data area corresponding to to-be-deleted data in the image of the old firmware version;

replicating the first data to the backup area; and converting the first data into the second upgrade data in the backup area according to the conversion path.

4. The method according to claim 3, wherein the method further comprises: when the first data exists in the to-be-upgraded data area, placing the first upgrade data in the backup area.

5. The method according to claim 3, wherein the method further comprises: when the first data exists in the to-be-upgraded data area, placing the first data in the backup area.

6. A firmware upgrade method, wherein the method comprises:
  obtaining an initial differential upgrade package based on difference data of an image of a new firmware version and an image of an old firmware version;
  splitting the image of the new firmware version to obtain a first data block of a first preset length, wherein the first data block is any data block obtained after the image of the new firmware version is split;
  splitting, based on a data area corresponding to the generated first data block in the initial differential upgrade package, the initial differential upgrade package to obtain a second data block, wherein the second data block is any data block obtained after the initial differential upgrade package is split, by:
    determining a field range corresponding to each first data block in the initial differential upgrade package; and
    splitting the initial differential upgrade package using an end address of each field range as a splitting point of the initial differential upgrade package;
  determining a dependency of the second data block on each original data block in the image of the old firmware version; and
  updating the second data block based on the dependency to obtain a block differential upgrade package, wherein the updating the second data block comprises: replacing a part or all of data in the second data block with an operation instruction, wherein the operation instruction is used to instruct to generate, based on the original data block, data that is in the second data block and that is replaced with the operation instruction.

7. The method according to claim 6, wherein the determining a dependency of the second data block on each original data block in the image of the old firmware version comprises:
  when the part or all of the data in the second data block can be obtained based on the original data block, updating the dependency on the original data block, wherein the data in the second data block can be obtained using one or more original data blocks.

8. The method according to claim 7, wherein the updating the second data block based on the dependency comprises:
  determining the operation instruction corresponding to the part or all of the data that is in the second data block and that is obtained based on the original data block, wherein the operation instruction comprises one or more of the following: an instruction to translate the original data block to a specified field location, an instruction to delete data in a preset area of the original data block, and an instruction to transform the original data block based on a specified path; and
  adding the operation instruction to the second data block and deleting the part or all of the data.

9. The method according to claim 8, wherein the method further comprises: updating the dependency on the original data block each time a second data block is updated.

10. A firmware upgrade apparatus, wherein the apparatus comprises:
  a memory configured to store computer executable instructions; and
  a processor, wherein when the processor executes the computer executable instructions, the apparatus is configured to:
  sequentially obtain first upgrade data and operation instructions in all data blocks in a block differential upgrade package, wherein the first upgrade data is data added in an image of a new firmware version in comparison with an image of an old firmware version, and the operation instruction is used to instruct to obtain second upgrade data based on data in the image of the old firmware version;
  determine a field range corresponding to each first data block from among all the data blocks in the block differential upgrade package;
  split the block differential upgrade package using an end address of each field range as a splitting point of the block differential upgrade package;
  convert first data into the second upgrade data in the image of the old firmware version according to the operation instruction, wherein the first data is data in the image of the old firmware version; and
  control the first upgrade data and the second upgrade data to overwrite a to-be-upgraded data area in the image of the old firmware version.

11. The apparatus according to claim 10, wherein when the processor executes the computer executable instructions, the apparatus is further configured to:
  obtain a field range of the corresponding first data indicated by the operation instruction;
  determine the first data from the image of the old firmware version based on the field range; and
  convert the first data into the second upgrade data in the image of the old firmware version according to a conversion path in the operation instruction.

12. The apparatus according to claim 11, wherein when the processor executes the computer executable instructions, when converting the first data into the second upgrade data in the image of the old firmware version according to the conversion path in the operation instruction, the apparatus is further configured to:
  determine a backup area in the image of the old firmware version, wherein the backup area is a data area corresponding to to-be-deleted data in the image of the old firmware version;
  replicate the first data to the backup area; and
  convert the first data into the second upgrade data in the backup area according to the conversion path.

13. The apparatus according to claim 12, wherein the apparatus further comprises: a first data backup unit, configured to: when the first data exists in the to-be-upgraded data area, place the first upgrade data in the backup area.

14. The apparatus according to claim 12, wherein the apparatus further comprises: a second data backup unit, configured to: when the first data exists in the to-be-upgraded data area, place the first data in the backup area.

15. A firmware upgrade apparatus, wherein the apparatus comprises:
  a memory configured to store computer executable instructions; and
  a processor, wherein when the processor executes the computer executable instructions, the apparatus is configured to:
  obtain an initial differential upgrade package based on difference data of an image of a new firmware version and an image of an old firmware version;
  split the image of the new firmware version to obtain a first data block of a first preset length, wherein the first data block is any data block obtained after the image of the new firmware version is split;
  split, based on a data area corresponding to the generated first data block in the initial differential upgrade package, the initial differential upgrade package to obtain a second data block, wherein the second data block is any data block obtained after the initial differential upgrade package is split, by:
   determining a field range corresponding to each first data block in the initial differential upgrade package; and
   splitting the initial differential upgrade package using an end address of each field range as a splitting point of the initial differential upgrade package;
determine a dependency of the second data block on each original data block in the image of the old firmware version; and
update the second data block based on the dependency to obtain a block differential upgrade package, wherein the updating the second data block comprises: replacing a part or all of data in the second data block with an operation instruction, wherein the operation instruction is used to instruct to generate, based on the original data block, data that is in the second data block and that is replaced with the operation instruction.

16. The apparatus according to claim 15, wherein when the processor executes the computer executable instructions, the apparatus is further configured to:
   if the part or all of the data in the second data block can be obtained based on the original data block, update the dependency on the original data block, wherein the data in the second data block can be obtained by using one or more original data blocks.

17. The apparatus according to claim 16, wherein when the processor executes the computer executable instructions, the apparatus is further configured to:
   determine the operation instruction corresponding to the part or all of the data that is in the second data block and that is obtained based on the original data block, wherein the operation instruction comprises one or more of the following: an instruction to translate the original data block to a specified field location, an instruction to delete data in a preset area of the original data block, and an instruction to transform the original data block based on a specified path; and
   add the operation instruction to the second data block and delete the part or all of the data.

18. The apparatus according to claim 17, wherein the apparatus further comprises: a second dependency update unit, configured to update the dependency on the original data block each time one second data block is updated.

* * * * *